US010460004B1

(12) United States Patent
Yanacek et al.

(10) Patent No.: US 10,460,004 B1
(45) Date of Patent: Oct. 29, 2019

(54) LOAD REGULATION USING DYNAMICALLY DETERMINED TIME TO LIVE VALUES

(75) Inventors: David C. Yanacek, Seattle, WA (US); David A. Killian, Seattle, WA (US); Krishnan Narayanan, Redmond, WA (US); Matthew J. Wren, Seattle, WA (US); Samuel J. Young, Seattle, WA (US); Eric D. Crahen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 367 days.

(21) Appl. No.: 13/168,761

(22) Filed: Jun. 24, 2011

(51) Int. Cl.
G06F 16/957 (2019.01)

(52) U.S. Cl.
CPC .................. *G06F 16/9574* (2019.01)

(58) Field of Classification Search
CPC ........... G06F 17/30902; G06F 16/9574; H04L 67/2852
USPC .......................................... 709/219; 711/133
See application file for complete search history.

(56) References Cited

U.S. PATENT DOCUMENTS

| | | | | |
|---|---|---|---|---|
| 6,078,943 A * | 6/2000 | Yu | ........................... | G06F 9/505 718/102 |
| 6,128,701 A * | 10/2000 | Malcolm | ........... | G06F 17/30902 707/E17.12 |
| 6,157,942 A * | 12/2000 | Chu | ..................... | H04L 61/1523 709/203 |
| 6,324,182 B1 * | 11/2001 | Burns | ............... | G06F 17/30902 370/429 |
| 6,772,203 B1 | 8/2004 | Feiertag et al. | | |
| 6,799,251 B1 * | 9/2004 | Jacobs et al. | ................. | 711/133 |
| 7,330,933 B2 * | 2/2008 | Crick | ................ | G06F 17/30902 707/E17.12 |
| 7,331,038 B1 | 2/2008 | Snodgrass et al. | | |
| 7,454,457 B1 * | 11/2008 | Lowery | ................... | H04L 47/10 709/201 |
| 7,624,047 B1 | 11/2009 | Round | | |
| 7,975,025 B1 * | 7/2011 | Szabo | ............... | G06F 17/30902 709/203 |
| 2001/0014103 A1 * | 8/2001 | Burns | ............... | G06F 17/30902 370/429 |
| 2003/0046343 A1 * | 3/2003 | Krishnamurthy | ........................... | G06F 17/30899 709/203 |
| 2003/0101231 A1 * | 5/2003 | Kausik | .................... | H04L 29/06 709/217 |

(Continued)

*Primary Examiner* — Philip J Chea
*Assistant Examiner* — Wing Ma
(74) *Attorney, Agent, or Firm* — Knobbe, Martens, Olson & Bear, LLP

(57) ABSTRACT

Time to live ("TTL") values are determined based on one or more factors. The TTL values may be included in responses to requests for resources, thereby affecting the frequency of subsequent requests. This dynamic determination of TTL values may provide resilience to system load, for example by using longer TTL values when the system is under greater load in order to reduce the rate at which subsequent requests are received. A dynamic TTL service may calculate a TTL value based on one or more factors, such as overall system load, resource load, hardware load, and/or software load. In various embodiments, a dynamic TTL service may act natively within a service, within a system framework, as a proxy, as a cluster, and/or as a broker.

21 Claims, 9 Drawing Sheets

(56) References Cited

U.S. PATENT DOCUMENTS

| | | | |
|---|---|---|---|
| 2003/0154265 A1* | 8/2003 | Raffaele | G06F 16/9574 709/221 |
| 2003/0187917 A1* | 10/2003 | Cohen | H04L 67/1095 709/203 |
| 2004/0073867 A1* | 4/2004 | Kausik et al. | 715/500 |
| 2004/0128346 A1* | 7/2004 | Melamed et al. | 709/203 |
| 2005/0010727 A1* | 1/2005 | Cuomo | G06F 16/9574 711/138 |
| 2005/0060497 A1* | 3/2005 | Krissell et al. | 711/133 |
| 2005/0120180 A1* | 6/2005 | Schornbach et al. | 711/133 |
| 2006/0129657 A1* | 6/2006 | O'Connell, Jr. | H04L 67/1095 709/217 |
| 2008/0215750 A1* | 9/2008 | Farber | G06F 9/505 709/233 |
| 2008/0228772 A1* | 9/2008 | Plamondon | G06F 17/30902 |
| 2008/0228938 A1* | 9/2008 | Plamondon | H04L 12/4641 709/233 |
| 2008/0229017 A1* | 9/2008 | Plamondon | H04L 67/2847 711/118 |
| 2008/0229021 A1* | 9/2008 | Plamondon | H04L 67/2847 711/125 |
| 2008/0229024 A1* | 9/2008 | Plamondon | H04L 67/28 711/126 |
| 2008/0229025 A1* | 9/2008 | Plamondon | G06F 12/0862 711/126 |
| 2008/0235292 A1* | 9/2008 | Janin et al. | 707/201 |
| 2010/0106833 A1 | 4/2010 | Banergee et al. | |
| 2010/0281114 A1* | 11/2010 | Popek et al. | 709/204 |
| 2010/0293335 A1* | 11/2010 | Muthiah et al. | 711/133 |
| 2011/0264865 A1* | 10/2011 | Mobarak et al. | 711/141 |
| 2012/0084382 A1* | 4/2012 | Robinson | 709/213 |
| 2012/0110110 A1* | 5/2012 | Luna | H04L 67/22 709/213 |
| 2012/0191918 A1* | 7/2012 | Mobarak et al. | 711/133 |
| 2012/0271908 A1* | 10/2012 | Luna et al. | 709/216 |
| 2012/0284356 A1* | 11/2012 | Luna | G06F 16/9574 709/213 |
| 2013/0132472 A1* | 5/2013 | Sundarrajan et al. | 709/203 |

* cited by examiner

```
                                                    451
                ┌─────────────────────────────────────────┐
                │ Receive content request from requester device │
                └─────────────────────────────────────────┘
                                    │
                                    ▼                452
                ┌─────────────────────────────────────────┐
                │   Calculate TTL value for requested content  │
                │         based at least partly on load data   │
                └─────────────────────────────────────────┘
                                    │
                                    ▼                453
                ┌─────────────────────────────────────────┐
                │  Return requested content with calculated TTL │
                │                    value                       │
                └─────────────────────────────────────────┘
```

*Fig.4a.*

```
int calculateDynamicTTL( int CPU_load, ── 410
              400        int RAM_load, ── 411
                         int avgResponseTime )
{                                              412
    int TTL_sec = 5;
                    420 if (CPU_Load > 80)       421
        TTL_sec += 30;
    else if (CPU_Load > 60)  422
        TTL_sec += 20;
    else if (CPU_Load > 40)  423
        TTL_sec += 10;
                                        424
    TTL_sec = TTL_sec * (RAM_load * .25)
                                              425
    if ((avgResponseTime * 100) > TTL_sec)
        TTL_sec = (TTL_sec * 4) + (avgResponseTime * 100);
                          426
    return TTL_sec;
}
```

*Fig.4b.*

LOAD REGULATION USING DYNAMICALLY DETERMINED TIME TO LIVE VALUES

BACKGROUND

Caching is an important technology for the efficient exchange of electronic resources, for example a request and response of a file across a network. A device may act as a requester by requesting a resource from another device, which may act as a provider by providing the resource in response to the request. A requester, such as a server or a user computing device, may require the same resource multiple times. Varying lengths of time may separate the instances in which the requester needs the provider's resource. In an attempt to avoid unnecessarily redundant requests, a requester may cache a resource after receiving it and use the cached copy the next time that resource is needed. Caching provides a number of benefits, such as providing the device requesting the resource with faster access to the resource, reducing network traffic, and reducing load on the device providing the resource. However, caching may come at a cost. The provider's copy of the resource may change after being provided to the requester. Should the requester later rely on a cached copy of the resource, that copy may be considered stale, since it is not equivalent to the copy then available to the provider. Using a stale copy of a resource may be less desirable than using a a "fresh" copy of the resource.

To reduce the use of stale copies, a system may employ a time to live ("TTL") mechanism in which the provider includes a TTL value when responding with a requested resource. The TTL value may suggest a time at which the requester should consider that copy of the resource to be stale. Should the requester need the resource before the TTL expires, it should use its cached copy of the resource. Should the requester need the resource after the TTL expires, it should request a new copy of the resource from the provider.

BRIEF DESCRIPTION OF THE DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein:

FIG. 4A is a flow diagram showing one embodiment of returning a calculated TTL value with requested content.

FIG. 4B shows one embodiment for dynamically calculating a TTL value based on a number of factors.

DETAILED DESCRIPTION OF SPECIFIC EMBODIMENTS

Figure 1:
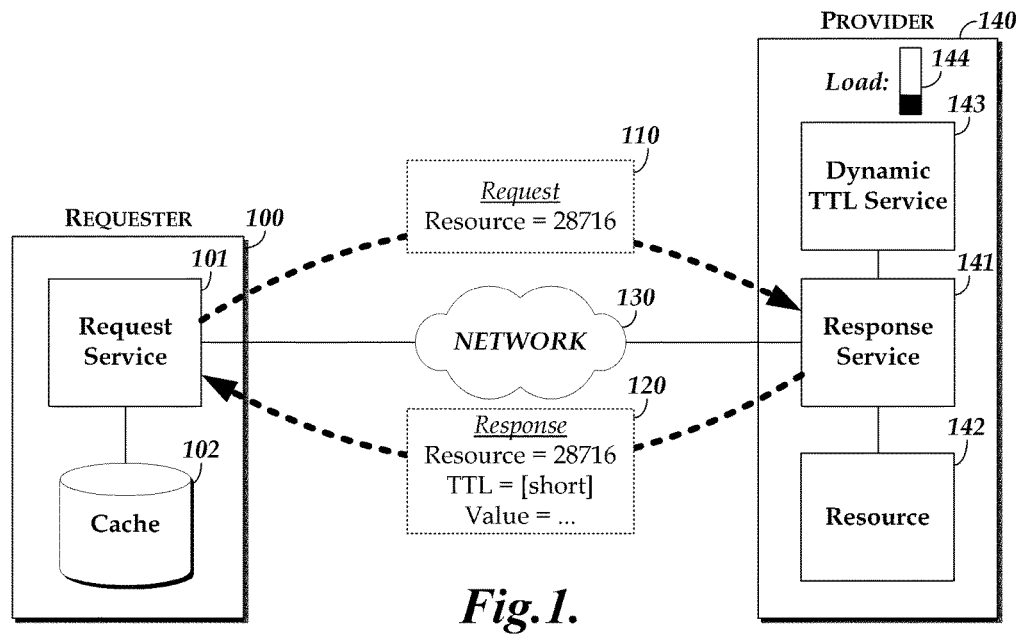
FIG. 1 depicts one embodiment of a system which uses dynamically determined TTL values in order to achieve load resilience.

Referring to FIG. 1, an embodiment is shown of a system which dynamically determines time to live ("TTL") values in order to achieve load resilience. The system includes a requester computing system or device 100 ("requester") which requests 110 a resource 142 from a provider computing system or device 140 ("provider"). The provider includes a dynamic TTL service 143 which dynamically determines a TTL value to associate with the resource 142 in the response 120 which provides the resource to the requester 100.

In the present embodiment, the provider 140 includes an internal measure of its current load 144. For example, the load 144 can be measured as or based on one or more of the following: (1) the percentage of use of one or more central processing units of the provider 140; (2) the rate of disk drive accesses performed by the provider 140; (3) the number of requests queued for processing by the provider 140; (4) the rate at which new requests are being received by the provider 140; (5) the amount or percentage of the provider's memory that is unused; and (6) the provider's average response time based on requests processed over the last N seconds. Numerous other measures of load (some of which are mentioned below) are known in the art and may additionally or alternatively be used. Further different load measures may be used for different types of requests serviced by the provider 140.

In the example scenario depicted by FIG. 1, the dynamic TTL service 143 accesses data indicating that the provider 140 is under a relatively low load 144. Given the present load, the provider 140 is presumed to be capable of efficiently responding to an increased rate of requests. Accordingly, the dynamic TTL service 143 determines that a short TTL value should be used, and the response 120 to the request 110 includes a short TTL value.

Figure 2:
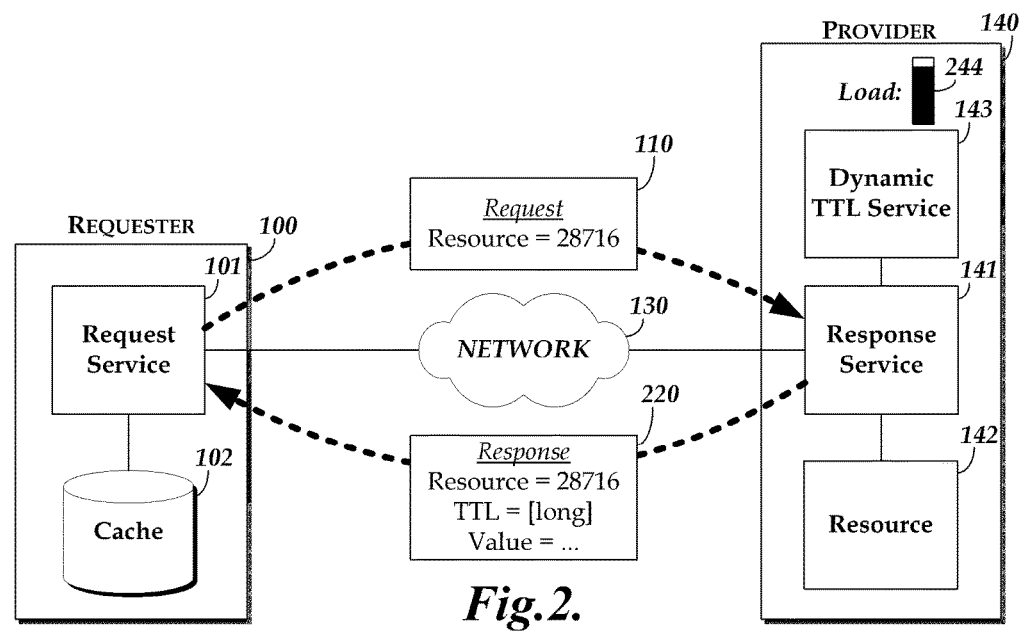
FIG. 2 depicts the same embodiment as FIG. 1, and shows the embodiment's behavior under different load circumstances.

By comparison, the same embodiment is shown in FIG. 2, only the provider 140 is shown under a higher load 244. As in FIG. 1, the provider in FIG. 2 receives a request 110 for a resource 142 and the dynamic TTL service 143 dynamically determines a TTL. The dynamic TTL service 143 accesses data indicating that the provider 140 is under a relatively high load 244, and the provider's response 220 includes a relatively long TTL value. As a result of the different TTL values, the requester 100 in FIG. 2 will treat the resource 142 as fresh (and thus will not request it again) for a longer time period than in FIG. 1, assuming the requester properly uses the TTL values. The provider 140 encourages or directs the requester 100 to obtain fresh data more frequently when the provider is capable of bearing the extra burden associated with more requests. When the provider is less capable of bearing an extra burden, it encourages or directs the requester 100 to rely on its cached data 102 for longer periods of time between requests.

Requester

The components illustrated within the present embodiment will next be described in greater detail to further illustrate how the embodiment provides load resilience using dynamically determined TTL values. The requester 100 may be an electronic computing system or device such as a server, desktop computer, laptop, tablet, phone, cloud-based service, server cluster, virtual device, or combination thereof. The requester 100 includes a request service 101 and a cache 102. The request service transmits a request 110 across a network 130. The request service 101 may be a particular application seeking a resource accessible over the network. For example, the request service 101 may be a web browser or component thereof.

The request service 101 is in communication with a cache 102. When the request service 101 receives a copy of a requested resource, the request service 101 may cause the copy to be stored in the cache 102. The cache 102 may be any of a variety of data stores, such as a database. In the present embodiment, the cache 102 stores a cached copy of the resource, indexed using a key value, and a TTL value associated with the cached resource.

When the request service 101 seeks a particular resource, it first checks whether a copy of the resource is stored in the cache 102 and, if so, whether the TTL for the cached copy of the resource has expired. If the cache 102 does not have a non-expired copy of the resource, the requester 100 transmits a request 110 for the resource. For example, a web-browser request service could transmit an HTTP GET request for a particular file resource. When the request service 101 receives a resource, it causes a copy of the resource to be stored in the cache 102. In another embodiment, the request service 101 will forego communicating with the cache, or ignore non-expired cached copies, for certain resources and/or under certain conditions. In certain embodiments, the requester 100 does not cache some resources.

A TTL value may be stored, for example, as a time when the associated resource should be considered stale and not relied upon. For example, a TTL value may be stored as data corresponding to a particular date and time, such as in a format Year:Month:Day:Hour:Minute:Second:Millisecond. In another embodiment, the TTL value is stored in as a number corresponding to a point in time using an epoch millisecond format. In one embodiment, the requester includes a service to automatically remove resources with expired TTL values from the cache 102.

In another embodiment, the requester 100 is a proxy. For example, the requester 100 may act as a proxy web cache daemon, such as by including the "Squid" computer software. In that embodiment, the proxy requester is located within a network between an originating requester and a provider 140. The originating requester transmits a request for a resource provided by the provider 140. The proxy requester intercepts the request and checks whether it has a cached copy 102 of the resource 142. If it does, the proxy requester may provide the cached copy 102 to the originating requester. If the proxy requester does not have a cached copy 102 stored, it transmits a request 110 to the provider 140 for the resource 142, receives the resource 142 in a response 120, caches the resource, and transmits the resource 142 in a response to the originating requester. In one embodiment, it will be understood that a copy of a resource is a digitally identical representation of the resource. In another embodiment, the provider 140 may be a proxy cache, such as the Squid software. For example, the proxy requester described above may act as a provider and respond to the originating requester's request with a response which includes a TTL value which the proxy requester dynamically determined.

Provider

In the present embodiment, a provider 140 makes a resource 142 available in response to a request 110. The provider 140 may be an electronic computing system or device such as a server, desktop computer, laptop, tablet, phone, cloud-based service, server cluster, virtual device, or combination thereof. A requester may communicate with the provider 140 through a network 130, such as the Internet. In another embodiment, the requester 100 communicates with the provider 140 using a means other than a network, for example using a direct connection. In one embodiment, the requester 100 and the provider 140 are components of a single hardware or software device. For example, the requester may be a process running on a server and the provider may be another process running on the server.

The provider of the present embodiment includes a response service 141 which receives a request 110. The request includes an identification of a requested resource. The response service 141 is configured to respond to a request 110 by transmitting a response 120. For example, a request 110 and/or response 120 may comprise data packets and/or a function call and corresponding returned value. The response service 141 is in communication with a resource 143. Upon receiving a request 110 for a resource, the response service 141 may determine whether it has access to the requested resource. For example, if an identification associated with the request 110 corresponds to an identification of a resource 142 accessible to the provider, the response service 141 may be capable of responding to the request 110. In another embodiment, the response service or some other service may also determine whether the requester 100 is authorized to receive the requested resource 142.

The response service in FIG. 1 provides a response 120 which includes the requested resource 142. Examples of resources which may be requested include a digital file, a software service, stored search results, inventory data, a database entry, or another electronic item which may be requested multiple times and stored. An example of providing a resource 142 in a response 120 is copying data corresponding to the resource 142 into the contents of a response communication, such as one or more packets. In one embodiment, the resource 142 is a database entry and the response service 141 transmits the response 120 by first accessing the database containing the resource 142. In some embodiments, the resource 142 is stored external to the provider 140.

The response service provides a TTL value associated with the response 120. The TTL value may specify a particular time at which the provided copy of the resource should be considered stale. For example, the TTL value may be formatted as a particular time, or as an amount of time. If the TTL value is specified as an amount of time, that may be the amount of time from when the time at which the response 120 was sent or received until the provided copy of the resource should be considered stale. In one embodiment, the TTL value is contained in a data packet which also contains at least some of the requested resource. In another embodiment, the TTL value is transmitted separately and may include some indicator of the resource which it is associated with.

The response service 141 obtains the TTL value from a dynamic TTL service 143. For example, the dynamic TTL service 143 may be implemented in software which provides an application programming interface ("API") including one or more functions requesting a dynamic TTL value. In another embodiment, the dynamic TTL service 143 may repeatedly update a memory location with a current TTL value and the response service 141 may access the TTL value presently stored at that memory location.

The dynamic TTL service 143 determines a TTL value based on one or more factors, for example factors associated with load 144. The dynamic TTL service 143 provides longer TTL values when there is more load 144 and shorter TTL values when there is less load 144. It will be understood that the term "short TTL value" refers to a TTL value of a shorter period of time relative to a "long TTL value." For example, a short TTL value may specify a point in time which will occur significantly sooner than a point in time specified by a long TTL value. A medium TTL value may specify a point in time occurring after the short TTL value but before the long TTL value.

Dynamic TTL Determination

Figure 3A:
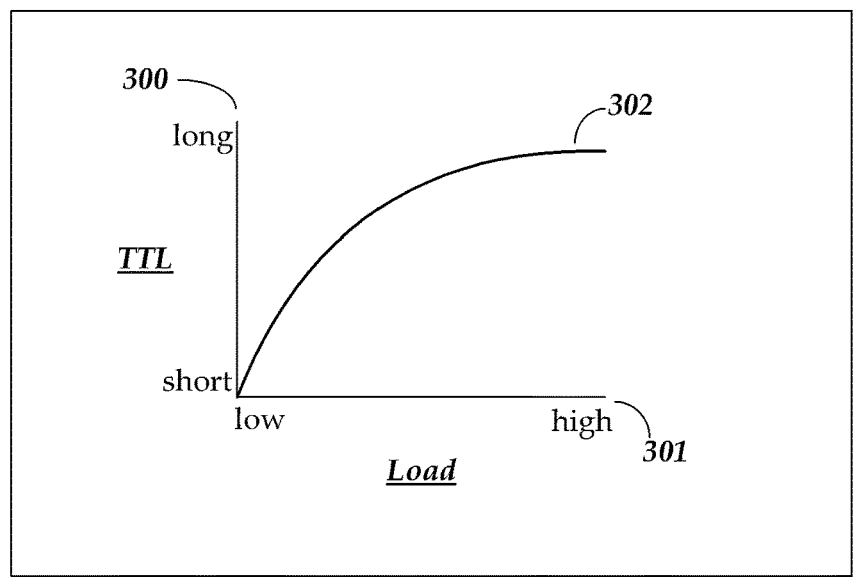
FIGS. 3A-B are illustrative representations of embodiments for dynamically determining TTLs value based on a load value.

FIG. 3a shows an example graph associated with determining a TTL value based on load. For example, a dynamic TTL service may use this graph, data corresponding to the graph (e.g., a look-up table), and/or a functional representation of the graph (e.g., an equation or formula, to determine a TTL value based on load. In other embodiments, other graphs or associated data or functional representations are used. FIG. 3a includes a graph with TTL values, ranging from short to long, along the dependent axis 300. The independent axis 301 represents load, which ranges from low to high. The illustrated function 302 associates a TTL value for any load value.

The illustrated function 302 represents a logarithmic relationship between load and TTL value. In another embodiment, a linear or exponential function is used. In another embodiment, the function mapping load values to TTL values comprises a combination of other functions. In another embodiment, a maximum and/or minimum TTL value is used. Example units of measure for load include percentage of use, amount of use, rate of use, heat, clock rate, and transfer rate. Example units of measure for TTL values include dates, days, hours, minutes, seconds and milliseconds. For example, the use of the terms "long," "short," "low," and "high" may be representations of the relative relationships amongst numeric values which certain embodiments use to format TTL and/or load values.

Figure 3B:
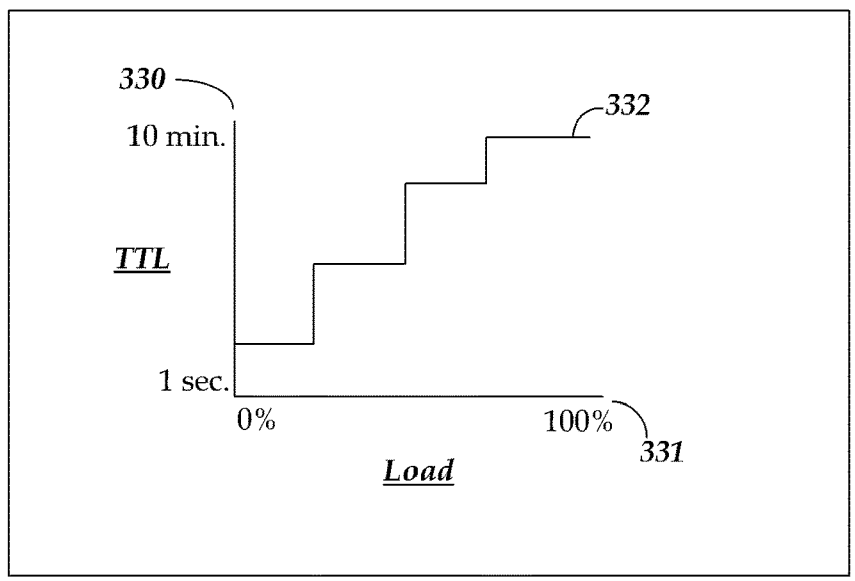

Referring to FIG. 3b, another embodiment is shown for determining a TTL value from a load value. In this embodiment, load is represented as a percentage between 0% and 100% 331, and possible TTL values range from 1 second to 10 minutes 330. The function uses a step-like pattern in calculating TTL values from load values 332.

FIG. 4a shows an embodiment of a method for regulating load using dynamic TTL values. The method begins when a request for content is received from a requester device 451. For example, a response service may receive a request from a request service. The method next calculates a TTL value for the requested content based at least in part on load data 452. For example, a dynamic TTL service may perform this calculation. Next, the requested content is returned along with the calculated TTL values 453. For example, a response service may return the content and TTL value.

Factors

Referring to FIG. 4b, an embodiment of a method for dynamically determining a TTL value is shown in the form of a software-based algorithm 400. The embodiment may be implemented by the dynamic TTL service 143. Many other methods and/or formats for dynamically determining a TTL value may be used. For example, a lookup table may be used where TTL values are associated with load values. Furthermore, any number of different software-based algorithms may be used, with the algorithm 400 of FIG. 4 serving as one example.

In the present embodiment, a dynamic TTL value is calculated by performing a software-based function call to a "calculateDynamicTTL" function, which returns an integer value. The integer value may represent the calculated dynamic TTL in seconds. In other embodiments, other units of measure are used, such as milliseconds, minutes, or a specific time specified in date-time format. The present function accepts three factors as input parameters 410-412 used in calculating a dynamic TTL value. The input parameters are an integer value representing CPU load 410 (for example, expressed as a number between 0 and 100 representing the current percentage), an integer value representing RAM load 411, and an integer value representing the average amount of time that the system is presently taking to respond to requests 412. Input parameters may be obtained from another source or calculated as needed. For example, CPU load and/or RAM load may be obtained from an operating system running on the provider device.

The average response time may be a helpful indicator of load because it measures a relevant, cumulative effect of a combination of other types of load measures. For example, a system may have a target response time which it attempts to answer all responses within. By dynamically adjusting TTL values based on how the current actual response time compares to the target response time, the system may better able to consistently meet its target response time.

The algorithm of FIG. 4b uses an integer variable "TTL_sec" representing the working value of a dynamically calculated TTL value. The variable is initially set to 5 seconds 420. The algorithm then performs a series of comparisons based on the CPU load variable. If the CPU load is over 80%, the working TTL value is increased by 30 seconds 421. Otherwise, if the CPU load is over 60%, the working TTL value is increased by 20 seconds 422. Otherwise, if the CPU load is over 40%, the working TTL value is increased by 10 seconds 423. If the CPU load is less than or equal to 40%, the working TTL value is not adjusted in response to CPU load. The working TTL value is next adjusted based on the RAM load. The working TTL value is set to the product of its former value and one quarter of the RAM load value 424. For example, if the RAM load was 20%, the working TTL value would be increased by a factor of 5 (TTL_sec*(20*0.25)). Next, the algorithm compares the working TTL value to a multiple of the average response time parameter and may increase the working TTL value by a factor of 4 and then add a multiple of the average response time to the working TTL value 425. After this series of logical and mathematical operations, the algorithm returns the working TTL value as the dynamically determined TTL value 426.

The algorithm, steps, and factors used in the FIG. 4b embodiment are examples of how a dynamic TTL value may be determined. Many other embodiments exist. For example, a dynamic TTL value may be determined based on one or more of a variety of factors, for example, factors representing an amount and/or percentage of (1) load on one or more central processing units of the provider, (2) load on random access memory of the provider, (3) load on a network interface of the provider (4) load on a particular software service, such as a response service of the provider, (5) load associated with a particular resource, such as the requested resource for which the TTL value is being dynamically determined and (6) an indicator of a mean and/or median response time associated with transmitting responses to received requests for resources.

In another embodiment, a TTL value is dynamically determined based at least in part on one or more factors which do not relate to load. For example, a TTL value may be determined at least in part on the identity of the requester which requested the resource. A requester may be considered a premium user which should be provided with fresher data than a standard user, and may receive a shorter TTL time as a result. Additionally or alternatively, the requester's location may be used as a factor—for example by using longer TTL values for requesters which are at relatively far from the provider. As another example, the TTL value may be determined based at least in part on other factors related to the provider, including factors relating to expected or predicted future conditions. For example, the provider may have an upcoming, scheduled system maintenance or virus scan and may provide longer TTL values in order to reduce the load which it is under during that time. As another example, if peak loads ordinarily occur at a particular time period each day (e.g., 5 pm to 6 pm PST), the TTL values may be set specifically to reduce the number of requests that are made during that time period.

Another embodiment uses dampening in order to provide less volatile TTL values. For example, the dynamic TTL service 143 may include a maximum rate of change between TTL values which it provides, and/or a maximum rate of change for TTL values based on time. The dynamic TTL service 143 may ensure that any TTL value which it determines differs by at most plus or minus 10% of all TTL values which it has provided during the past minute. Many other dampening methods and/or algorithms may be used. A dynamic TTL service 143 may include such dampening in order to provide some degree of consistency amongst dynamically determined TTL values.

Load Data

Figure 5:
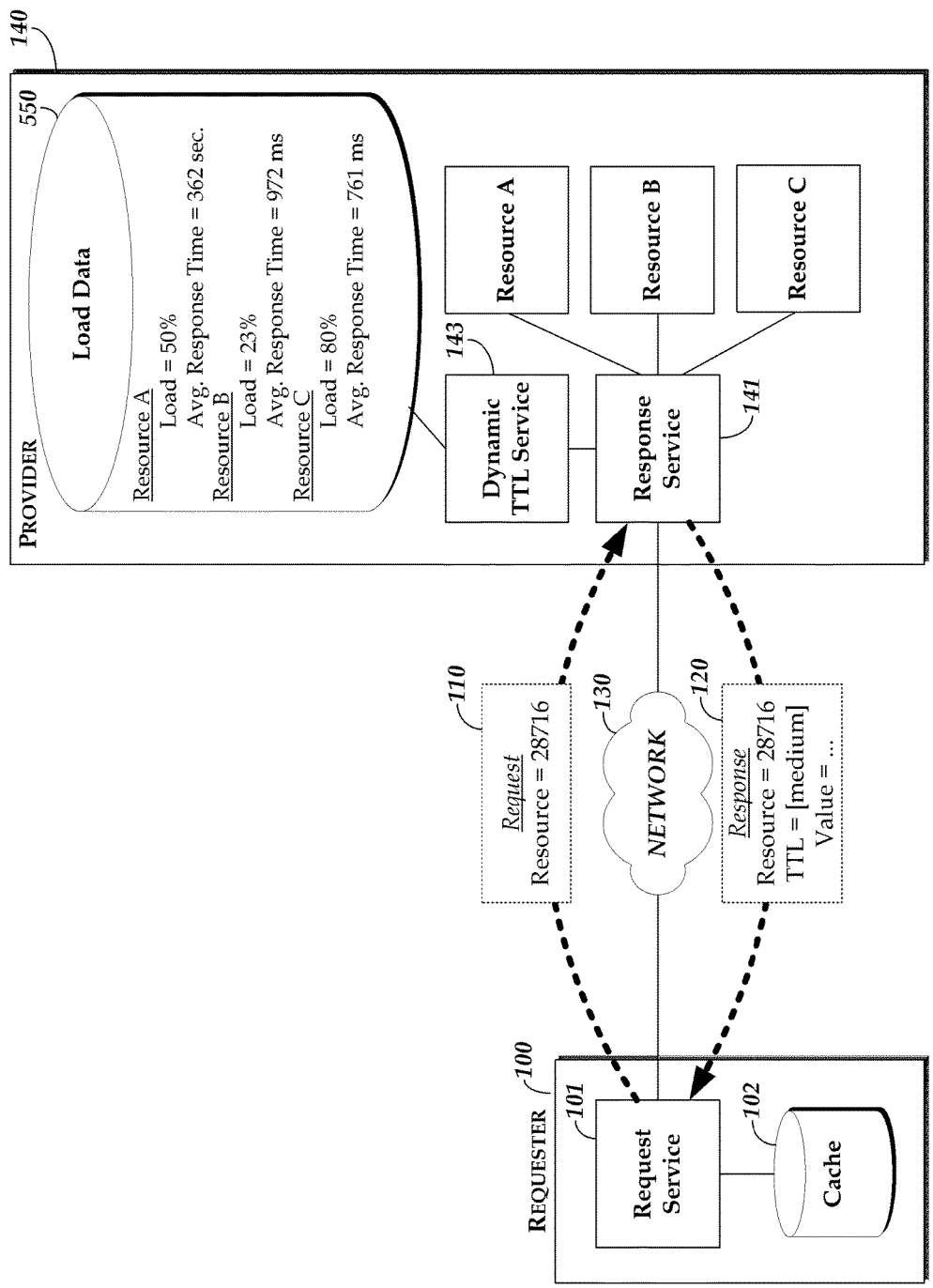
FIG. 5 depicts an embodiment of a system which uses dynamically determined TTL values in order to achieve load resilience for multiple resources.

Referring to FIG. 5, another embodiment is shown for dynamically determining TTL values. A plurality of resources, Resource A, Resource B, and Resource C are all shown. The dynamic TTL service 143 may calculate TTL values related to one resource differently as compared to calculating TTL values related to another resource. For example, the system may weight total load value more heavily for calculating a Resource A TTL, and may weight average response time more heavily for calculating a Resource B TTL. As another example, Resource A may change more frequently than Resource B, and the system may therefore be configured to provide shorter TTL values for Resource A than for Resource B. The same load values may therefore be considered, possibly with the same weight, in calculating Resource A's TTL values, but those Resource A TTL values may be a fraction of Resource B TTL values. In another embodiment, different combinations of one or more factors, algorithms, and/or methods are used for determining respective TTL values for various resources and/or groupings or categorizations of resources.

The present embodiment includes a load data store 550. The dynamic TTL service 143 is in communication with the load data store 550, for example in order to access data associated with load. In another embodiment, the dynamic TTL service 143 transmits data to the load data store 550, for example to record previously used TTL values. The load data store 550 stores data associated with different factors, such as individual load values for Resources A, B, and C. In the present embodiment, the load data store 550 is shown storing data associated with load and average response time for each of the three resources. In another embodiment, the load data store 550 stores load data describing the provider generally, or some component thereof. This system-wide load data may be stored instead of, or in addition to, resource-specific load data and data associated with other factors.

Historic Data

Figure 6:
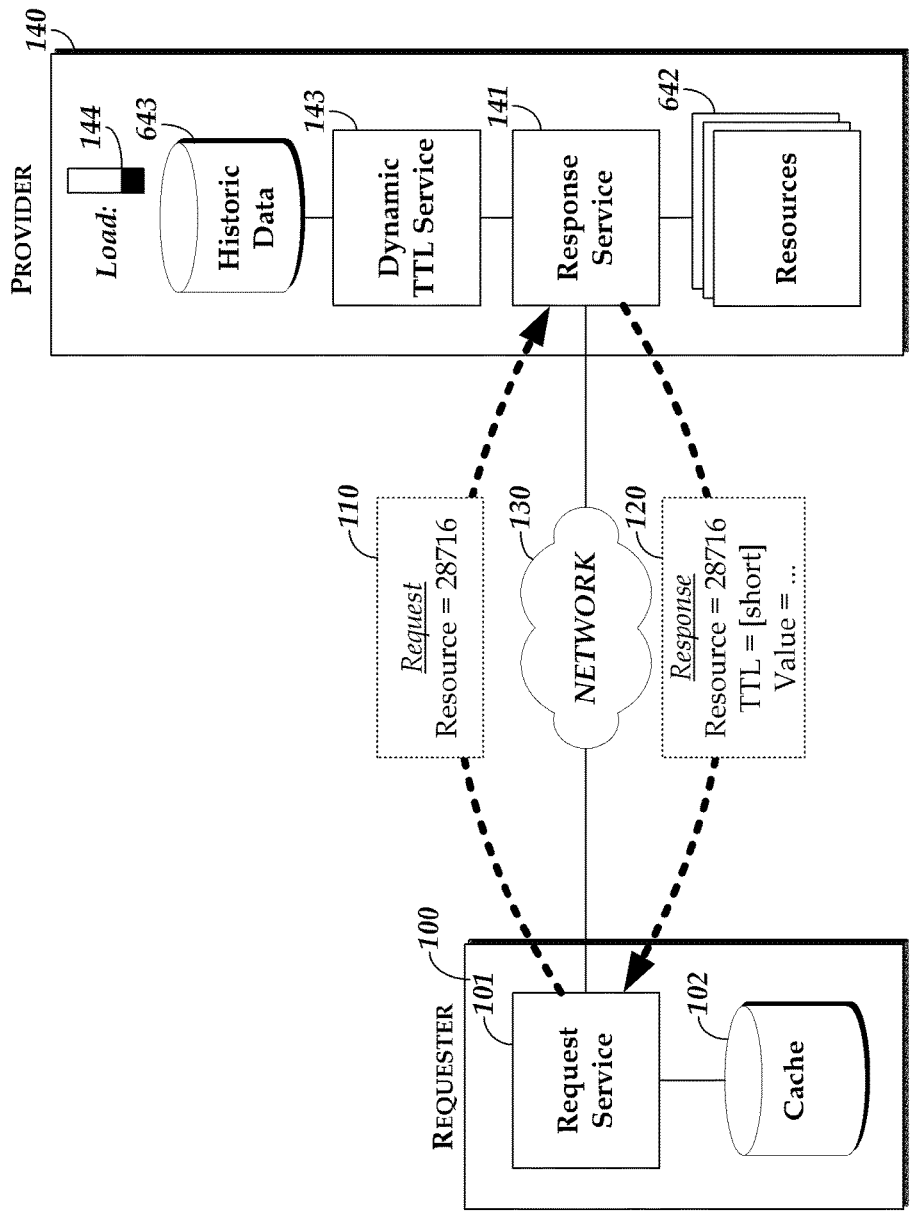
FIG. 6 depicts an embodiment of a system which uses TTL values which are dynamically determined using historic data.

Referring to FIG. 6, an embodiment is shown which uses historic data 643 to determine a dynamic TTL value. The system stores historic data 643, for example in a data store such as a database. Historic data may include data concerning one or more former values of a factor. Historic data may include data representative of past values for any factor, including resource-specific factors and system-wide factors. Such data could describe, for example the state of the factor at a particular point in time, the mean or median value for the factor over a range of time, the maximum recorded and/or observed value for the factor during a period of time, the minimum recorded and/or observed value for the factor during a period of time, or some other representation of previous values associated with the factor. For example, the historic data 643 may include data representing the provider's average CPU load during the previous hour. As another example, the historic data 643 may include data representing the number of requests 110 received for a particular resource of the various resources 642 shown in the present embodiment.

In one embodiment, the historic data 643 includes decaying values. For example, the historic data 643 may include a weighted average of past overall system load. The average may be weighted such that more recently recorded values are factored more heavily than values which were recorded longer ago, thereby decaying the weight of a particular value over time.

Another embodiment includes data related to predicted factor values, such as expected future load. Such predicted factor values may be determined at least in part on historic data 643. For example, the system may include data indicating a cyclic pattern of load, such as increased load between the hours of 8 a.m. and 6 p.m., or increased load during the summer months. The system may predict that future load will patterns of past load, such as the examples provided. This predicted factor data may be used in determining TTL values, possibly in connection with historic data 643, and/or data representative of present factor values.

Dynamic TTL Framework

Figure 7:
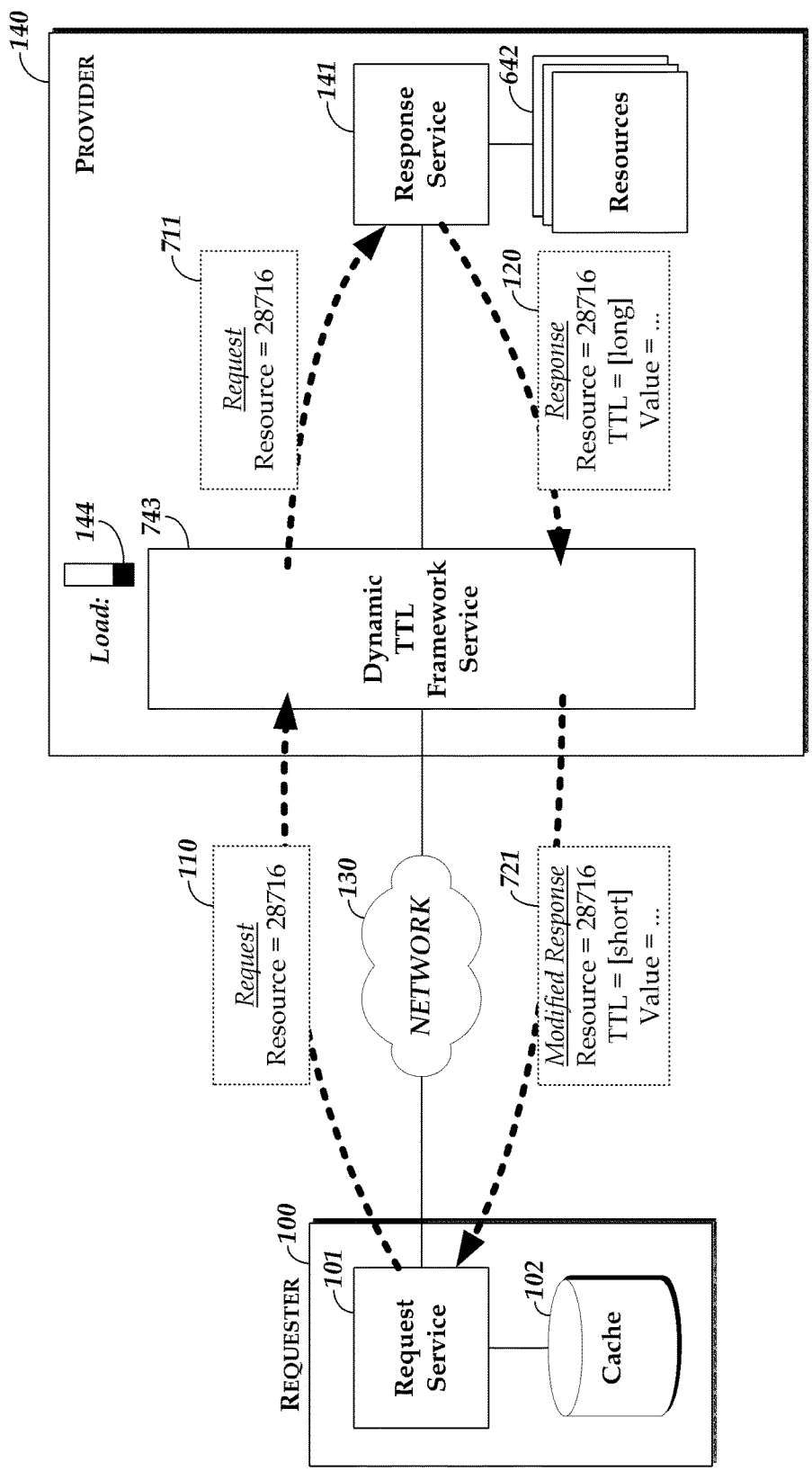
FIG. 7 depicts an embodiment of a system which uses a dynamic TTL framework service in order to provide dynamically determined TTL values.

Referring to FIG. 7, an embodiment is shown which uses a dynamic TTL framework service 743. Here, the provider 140 includes a framework which includes a dynamic TTL framework service 743. The dynamic TTL framework service 743 intercepts a request targeted for a response service 141 and transmits a repeated request 711 based on the intercepted request 110. The dynamic TTL framework service 743 also intercepts responses 120 transmitted by the response service 141. The dynamic TTL framework service 743 modifies the response 120 to create a modified response 721, and then transmits the modified response 721 to the request service 101.

The modified response 721 may include a different TTL value than the received response 120. For example, the response service 141 might not dynamically determine TTL values. The dynamic TTL framework service 743 could adjust the TTL values in responses transmitted by the response service 141 in order to transparently provide the response service 141 with load resilience. The dynamic TTL framework service 743 may therefore allow response services 141 and their associated resources 642 to be deployed without any inclusion of dynamic TTL determination, but for such response services 141 and their associated resources 642 to still reap the benefits of dynamic TTL determination.

The dynamic TTL framework service 743 may store data associated with the received request 110. Such data may be used in determining the TTL value to use in modifying the response 120. In another embodiment, the dynamic TTL framework service 743 does not intercept the request 110, and only intercepts the response 120.

Dynamic TTL Proxy

Figure 8:
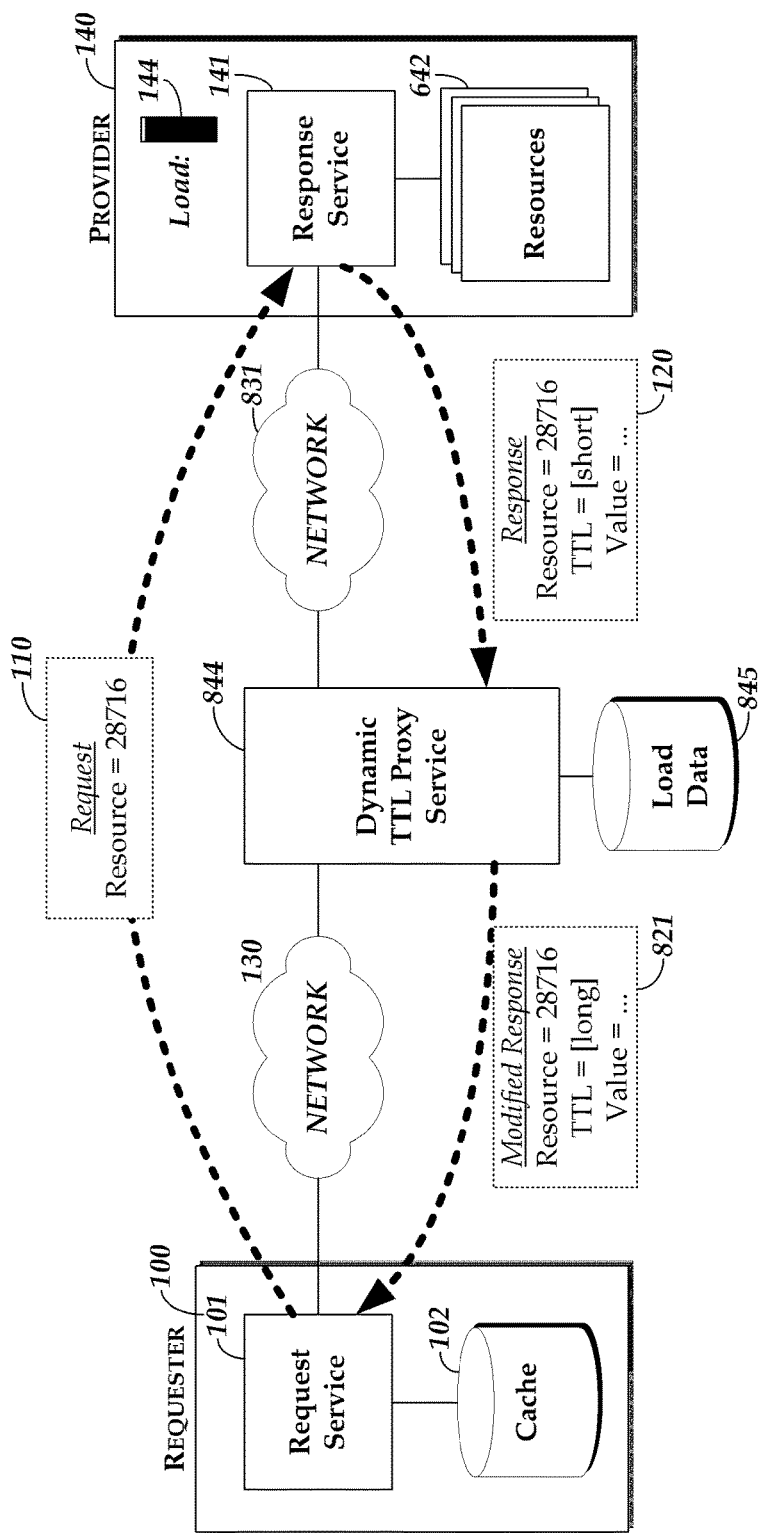
FIG. 8 depicts an embodiment of a system which uses a dynamic TTL proxy service in order to provide dynamically determined TTL values.

Referring to FIG. 8, an embodiment is shown which includes a dynamic TTL proxy service 844. The dynamic proxy service may be implemented by one or more computing devices configured with executable service code. Here, the dynamic TTL proxy service is connected by a network 130 to the request service, and is connected by a network 831 to the response service. The dynamic TTL proxy service 844 intercepts a response 120 transmitted by the provider 140, modifies the response, and transmits the modified response 821 to the requester 100. The dynamic TTL proxy service 844 may be in communication with load data 845. In one embodiment, the load data 845 is populated at least in part with information provided by the provider 140. In another embodiment, the load data 845 is gathered independently of the provider 140. For example, the load data 845 may be associated with the number or rate of responses 120 intercepted by the dynamic TTL proxy service 844. In one embodiment, the dynamic TTL proxy service 844 also intercepts a request 110 and then transmits an associated request to the provider 140.

In one embodiment, the two networks 130, 831 are the same network, such as the Internet. In another embodiment, the two networks are different. In another embodiment, one or both of the networks 130, 831 are replaced by a non-network communication channel, such as a direct cable connection.

Dynamic TTL Clustered Service

Figure 9:
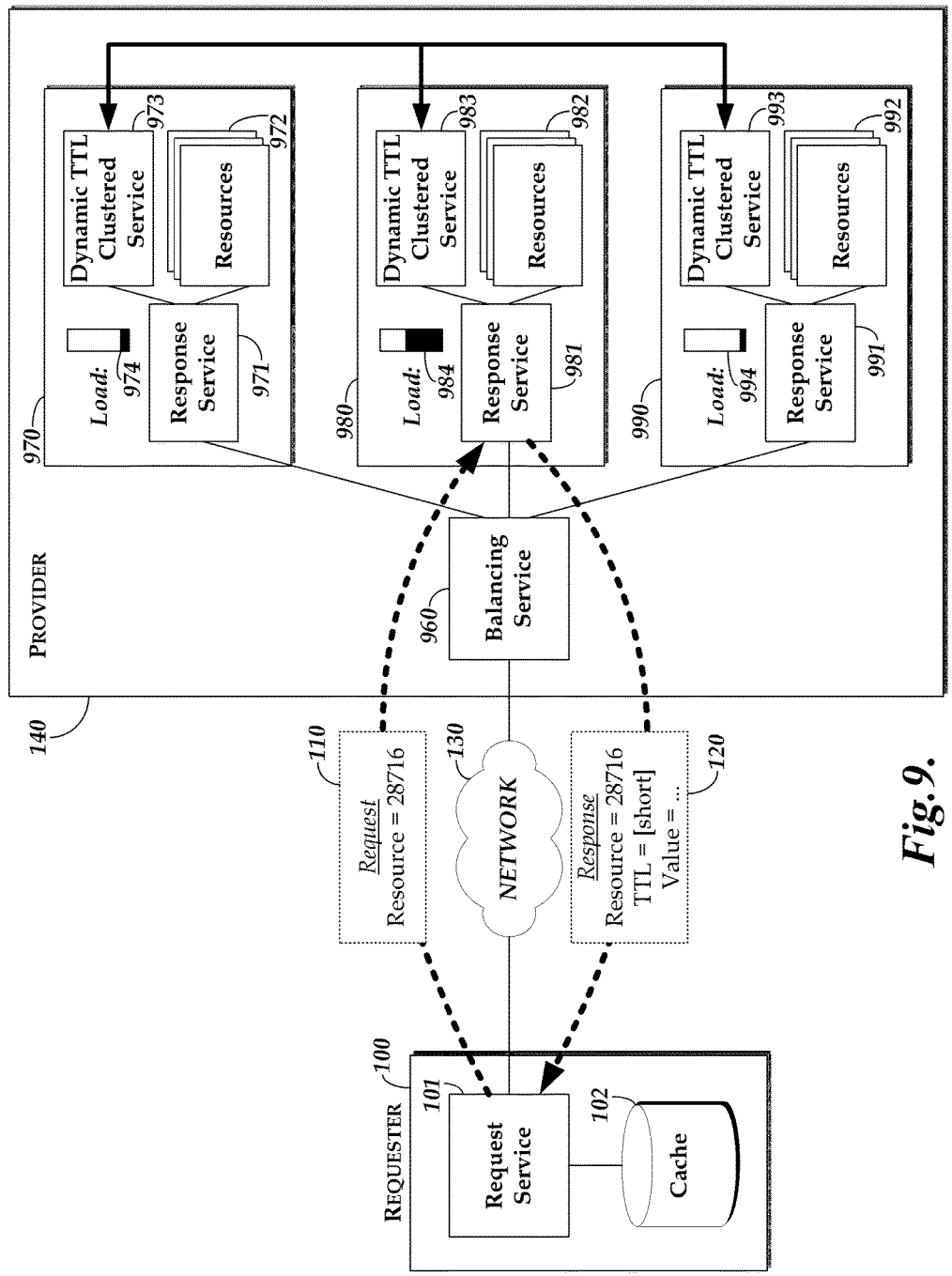
FIG. 9 depicts an embodiment of a system which uses clustered services which dynamically determine TTL values.

FIG. 9 illustrates an embodiment where the provider 140 includes multiple nodes 970, 980, 990. Each node may be a distinct physical computing device or machine, such as a physical server. The nodes 970, 980, 990 are in communication with a balancing service 960, such as a load balancing service. The balancing service 960 may be responsible for distributing and/or balancing tasks amongst the nodes. For example, the balancing service 960 may intercept requests 110 transmitted to the provider 140 and determine which of the nodes 970, 980, 990 should receive and respond to the request 110. The balancing service may make this determination based on factors associated with the nodes, and/or the request. For example, each node in the present embodiment is shown having a load value associated with it. The first node 970 has a low current load 974. The second node 980 has a moderate current load 984. The third node 990 has a low current load 994. The balancing service 960 may transmit the intercepted request 110 to a node selected at least in part on current load value. In another embodiment, the balancing service 960 does not intercept the request 110, but communicates with the response service 971, 981, 991 in order to affect the rate at which each response service picks up requests from a shared queue or stack.

Each of the illustrated nodes 970, 980, 990 includes a respective response service 971, 981, 991, dynamic TTL clustered service 973, 983, 993, set of resources 972, 982, 992 and load value 974, 984, 994. In one embodiment, each set of resource 972, 982, 992 is equivalent and each response service 971, 981, 991 is capable of responding to a particular request 110 for a resource. In another embodiment, the sets of resources are not equivalent.

The dynamic TTL clustered services 972, 983, 993 are in communication with each other. This clustered communication may be used to dynamically calculate a TTL value. For example, a dynamic TTL clustered service 983 is shown having received a request 110 for a resource with identification 28716. That dynamic TTL clustered service 983 is associated with a node that is presently under moderate load 984. If a dynamic TTL service were to determine a dynamic TTL value based on this fact alone, it may determine that a medium-length TTL value is appropriate. However, the dynamic TTL clustered service 983 shown communicates with other dynamic TTL clustered service 973, 993, which are associated with nodes 970, 990 having low loads 974, 994. The dynamic TTL clustered service 983 in the present embodiment determines that the overall system load is therefore fairly low. Consequently, the dynamic TTL clustered service 983 provides a short TTL value, which is used in the response 120 transmitted by the provider 140. In one embodiment, one or more nodes 970, 980, 990 has a dynamic TTL framework. In another embodiment, the balancing service 960 behaves at least in part on the behavior and/or determinations of one or more dynamic TTL clustered service. For example, the balancing service 960 may distribute more requests 110 to a node which tends to provide short TTL values.

Dynamic TTL Broker Service

Figure 10:
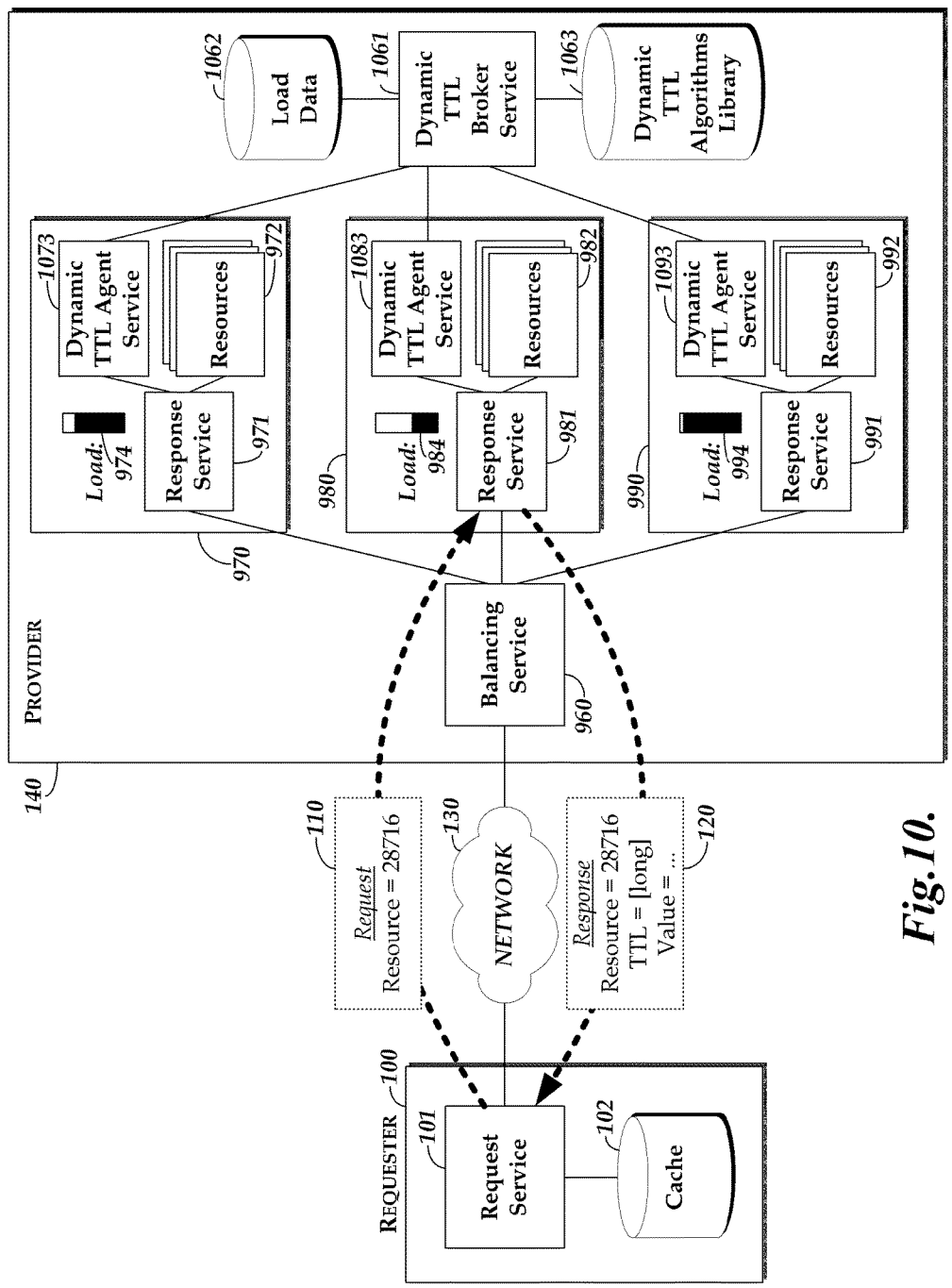
FIG. 10 depicts an embodiment of a system which uses a centralized service to dynamically determine TTL values.

FIG. 10 illustrates another embodiment of a system for providing dynamically determined TTL values. In this embodiment, the system includes a dynamic TTL broker service 1061, dynamic TTL agent services 1073, 1083, 1093, a plurality of nodes 970, 980, 990, and a balancing service 960. Each node includes a dynamic TTL agent service 1073, which is in communication with a dynamic TTL broker service 1061. The dynamic TTL broker service 1061 acts as a central service for determining TTL values for distributed nodes. For example, a response service 981 may receive a request 110. The response service 981 may request a dynamically determined TTL value from a dynamic TTL agent service 1083 associated with the response service 981. The dynamic TTL agent service may rely, at least in part, on the dynamic TTL broker service 1061 to determine the dynamic TTL value. The dynamic TTL broker service 1061 may assist a plurality of dynamic TTL agent services 1073, 1083, 1093 in determining dynamic TTL values.

The dynamic TTL broker service 1061 has access to load data 1062 which may include data representative of load for the provider 140 as a whole, and/or individual nodes 970, 980, 990 within the provider 140. For example, in FIG. 10, the dynamic TTL broker service 1061 accesses data indicating that two of the three nodes are under high load 974, 994. The dynamic TTL broker service 1061 therefore provides a long TTL value in response to a request from a node 980, even though that particular node 980 is under a low load 984.

Dynamic TTL Algorithms

The embodiment of FIG. 10 includes a dynamic TTL algorithms library. Other embodiments may also include a dynamic TTL algorithms library, including embodiments which do not use a dynamic TTL broker service 1061. The dynamic TTL algorithms library 1063 includes data representative of a plurality of algorithms which may be used to dynamically determine a TTL value. The dynamic TTL algorithms library may also include data representative of scores associated with the various algorithms, such that a higher score indicates that one algorithm may provide better dynamic TTL values than another algorithm. In the present embodiment, a dynamic TTL algorithm is considered better if it results in better load resilience and/or less volatile load.

The dynamic TTL broker service 1061 may communicate with the dynamic TTL algorithms library 1063 in order to select a dynamic TTL algorithm to use in calculating a dynamic TTL. Other dynamic TTL services may also communicate with dynamic TTL algorithms libraries. In one embodiment, an algorithm is selected from the dynamic TTL algorithms library 1063 based at least in part on the resource or type of resource requested. For example, the dynamic TTL algorithms library 1063 may include some algorithms which are indicated as being better suited for particular resources than other algorithms.

In one embodiment, a plurality of algorithms associated with the dynamic TTL algorithms library 1063 compete against each other to determine how well suited the algorithms are at dynamically determining TTL values. For example, the dynamic TTL broker service 1061 may use one algorithm from the library 1063 on the first node 970, and a second algorithm from the library 1063 on the second node 980. If it is then observed that the first node is under more load than the second node, it may be determined that the algorithm used by second node is better than the algorithm used by the first node. In another embodiment, the quality of each algorithm is measured based at least in part on one or more factors other than its ability to minimize load. For example, each algorithm may be judged based on a combination of (1) its ability to maintain the relevant provider load within a target range, and (2) its ability to minimize instances in which the TTL values enable requesters to use stale data.

In another embodiment, an algorithm, such as an algorithm within the dynamic TTL algorithms library 1063, evolves over time. For example, an algorithm may include a number of adjustable values which affect how it calculates a dynamic TTL value. The algorithm may be deployed with these adjustable values set to certain amounts, and then have one or more of the values adjusted. If the algorithm is considered to operate better with the adjusted values, those values may be indicated as better values, and may be kept for use.

Requester-Side Dynamic TTL Determination

In one embodiment, a requester determines a dynamic TTL for a resource. For example, the requestor may receive a copy of a requested resource from a provider, and may optionally also receive a TTL, associated with that resource, from the provider. The requester may dynamically determine a TTL for the resource and use that requester-determined TTL instead of, or in some combination with, the provided TTL. The requestor may dynamically determine the TTL based on one or more factors. Some factors may be determined based on observation, such as the requester observing the provider's delay in responding to requests. Alternatively or additionally, some factors may be provided to the requester, such as by a provider.

CONCLUSION

Dynamically determining TTL values may be applicable to a variety of fields and/or protocols. For example, in one embodiment, a TTL value in an Internet Protocol header is dynamically determined. In another embodiment, the "Expires" header in an HTTP response is dynamically determined, and is therefore a dynamically determined TTL.

In another embodiment, the "expires" field in an HTTP cookie is dynamically determined, and is therefore a dynamically determined TTL. In yet another embodiment, a Domain Name Server ("DNS") record has a dynamically determined TTL value associated with it. For example, a TTL value may be dynamically determined by an authoritative DNS nameserver for a particular DNS resource record. A caching DNS name server may obtain the record from the authoritative name server, including the dynamically determined TTL for the record.

The system for providing dynamically determined TTL values may be implemented as computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state.

Each of the services, such as 101, 143, 141 shown in FIG. 1, may be implemented in an appropriate combination of computer hardware and software, or in application-specific circuitry. For example, each such service may be implemented in service code executed by one or more physical servers or other computing devices. The service code may be stored on non-transitory computer storage devices or media. The various data repositories, for example 102, 142, 550, 643, 845, 1063, may include persistent data storage devices (hard drives, solid state memory, etc.) that store the disclosed data, and may include associated code for managing such data. Resources such as 142 may be, for example a service, a data repository, or a combination thereof.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A computer-implemented method of regulating server load, the method comprising:
   monitoring a load level of a server system that provides network-based access to a retrievable content resource;
   regulating the load level of the server system by varying time-to-live (TTL) values sent to requester devices with the retrievable content resource, such that the TTL values are varied according to a function in which TTL values are directly proportional to the load level of the server system, whereby increases in the load level of the server system cause higher TTL values to be used; and
   adaptively varying an algorithm used to calculate said TTL values based on load regulation feedback data reflective of an effectiveness of the TTL values;
   said method performed programmatically by a computing system.

2. The method of claim 1, wherein adaptively varying an algorithm used to calculate said TTL values comprises adjusting one or more parameters of the algorithm that affect how the algorithm calculates TTL values.

3. The method of claim 1, wherein monitoring a load level of the server system comprises monitoring at least one of: (1) CPU utilization, (2) number of requests queued for processing, (3) rate of receipt of requests by the server system, or (4) quantity of unused memory.

4. The method of claim 1, wherein varying the TTL values comprises calculating a TTL value for the content resource based on both (1) said load level, and (2) a variability of the content resource.

5. The method of claim 1, wherein the computing system is a proxy system that is separate from the server system, wherein the proxy system regulates the load level of the server system by modifying TTL values of responses generated by the server system.

6. The method of claim 1, wherein the computing system is part of the server system.

7. Non-transitory computer storage having stored thereon executable program code that instructs a computing system to perform a load regulation process that comprises:
   monitoring a load level of a server system that provides network-based access to a retrievable content resource, said server system comprising one or more physical servers;
   regulating the load level of the server system by varying time-to-live (TTL) values sent to requester devices with the retrievable content resource, such that the TTL values are varied according to a function in which TTL values are directly proportional to the load level of the server system, such that increases in the load level of the server system cause higher TTL values to be used; and
   adaptively varying an algorithm used to calculate said TTL values based on load regulation feedback data reflective of an effectiveness of the TTL values.

8. The non-transitory computer storage of claim 7, wherein adaptively varying an algorithm used to calculate said TTL values comprises adjusting one or more parameters of the algorithm that affect how the algorithm calculates TTL values.

9. The non-transitory computer storage of claim 7, wherein monitoring the load level of the server system comprises monitoring at least one of the following: (1) CPU utilization, (2) number of requests queued for processing, (3) rate of receipt of requests by the server system, or (4) quantity of unused memory.

10. The non-transitory computer storage of claim 7, wherein varying the TTL values comprises calculating a TTL value for the content resource based on both (1) said load level, and (2) a variability of the content resource.

11. The non-transitory computer storage of claim 7, wherein the computing system is a proxy system that is separate from the server system, wherein the proxy system regulates the load level of the server system by modifying TTL values of responses generated by the server system.

12. The non-transitory computer storage of claim 7, wherein the computing system is part of the server system.

13. A computer-implemented process of regulating load, the process comprising:
   monitoring a load level of a server system that provides network-based access to a retrievable content resource;
   detecting a cyclic pattern in said load level;
   receiving a request for the content resource from a requester device; and
   selecting a time-to-live (TTL) value to provide to the requester device with the content resource such that the TTL value is selected based at least partly on the detected cyclic pattern in the load level;
   said process performed programmatically by a computing system that comprises one or more computing devices.

14. The process of claim 13, wherein the TTL value is selected such that a likelihood that the requester device will subsequently request the content resource during a peak load period is reduced.

15. The process of claim 13, wherein monitoring a load level of the server system comprises monitoring at least one of: (1) CPU utilization, (2) number of requests queued for processing, (3) rate of receipt of requests by the server system, (4) quantity of unused memory.

16. The process of claim 13, wherein varying the TTL values comprises calculating a TTL value for the content resource based on at least (1) said load level, and (2) a variability of the content resource.

17. The process of claim 13, wherein the computing system is a proxy system that is separate from the server system, wherein the proxy system regulates the load level of the server system by modifying TTL values of responses generated by the server system.

18. The process of claim 13, wherein the computing system is part of the server system.

19. The non-transitory computer storage of claim 13, wherein the cyclic pattern is a daily load pattern.

20. The non-transitory computer storage of claim 13, wherein the cyclic pattern is an annual load pattern.

21. Non-transitory computer storage having stored thereon executable program code that instructs a computing system to perform a load regulation process that comprises:
   monitoring a load level of a provider system that provides network-based access to a retrievable content resource;
   detecting a cyclic pattern in said load level;
   receiving a request for the content resource from a requester device; and
   selecting a time-to-live (TTL) value to provide to the requester device with the content resource such that the TTL value is selected based at least partly on the detected cyclic pattern in the load level.

* * * * *